Oct. 12, 1965          W. H. FISK ETAL          3,210,859
                       SKIN DIVER'S COMPASS
Filed Dec. 23, 1963                           2 Sheets-Sheet 1

INVENTORS
WOOSTER HAYDEN FISK
HAROLD A. KELLER
BY
*Wells & St.John*
ATTYS.

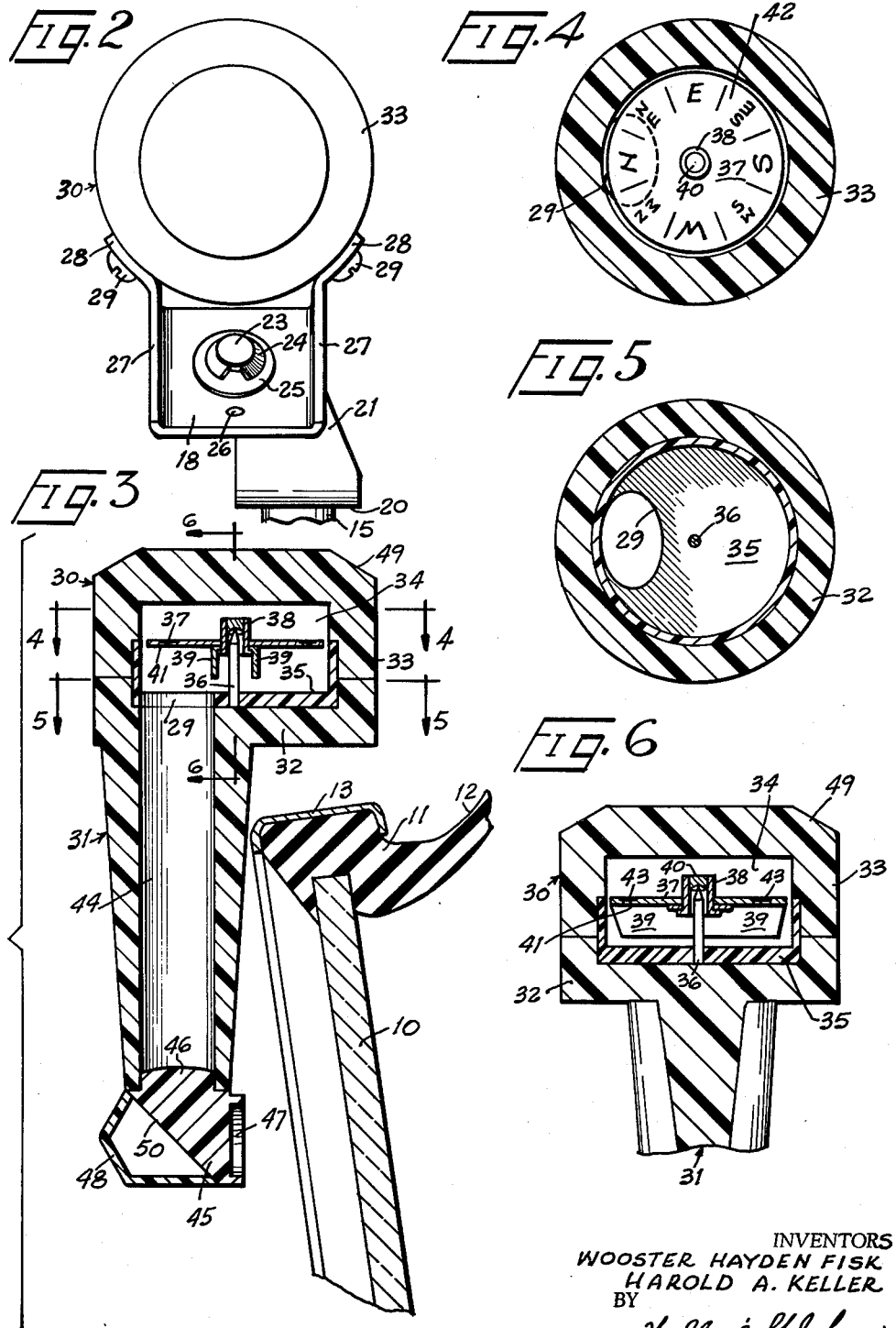

United States Patent Office 3,210,859
Patented Oct. 12, 1965

3,210,859
SKIN DIVER'S COMPASS
Wooster Hayden Fisk, 701 Riverview, and Harold A. Keller, Rte. 1, Box 174, both of Clarkston, Wash.
Filed Dec. 23, 1963, Ser. No. 332,690
6 Claims. (Cl. 33—222)

This invention relates to a novel underwater compass for use by skin divers.

A person skin diving at depths considerably below the surface of water requires a compass in order to maintain his proper bearing relative to the boat from which he is working, and relative to the underwater terrain as he knows it. Light alone often cannot be used as an indication of direction, since light becomes confused under water and eventually light intensity becomes apparently equal in all directions. Various underwater compasses have been demonstrated with some degree of success, however most of such devices are simply waterproof versions of a common compass and must either be worn on the person's wrist or held before him in order to make a bearing. Many such compasses are confusing, since the user must turn opposite to the desired bearing as it appears on the compass in order to correct his course.

It is a first object of this invention to provide a compass designed primarily for use in skin diving, adapted to make the maximum use of available light, both visible and invisible.

Another object of this invention is to provide such a compass that can be mounted on a conventional face mask without modifying the structure of the mask, and which can be readily swung to a storage position wherein it will not interfere with the normal use of the diver's conventional equipment.

Another object of this invention is to provide such a compass which, when in use, will provide a constant visual image of the compass bearing toward which the diver is directed, this image appearing in one eye at all times and requiring no manipulation in order to take a reading.

Another object of this invention is to provide such a device in a rather simple structure basically manufactured of plastics so as to resist accidental damage and permanently sealed so as to eliminate the possibility of water damage.

Another object of this invention is to provide such a compass to insure a visual indicator to the diver such that when correcting his course the diver can turn toward the desired bearing as it appears in the image which he sees.

These and further objects of the invention will be obvious from a study of the enclosed drawings and the following detailed description of a preferred embodiment of this invention. It is to be understood, however, that this form of the invention is presented only by way of example, and that it is not intended to specify the limitations of the invention, which are set out in detail in the claims that follow this disclosure.

In the drawings:

FIGURE 2 is a top view of the compass as it is seen in FIGURE 1;

FIGURE 3 is a vertical sectional view of the compass and face mask taken along line 3—3 in FIGURE 1;

FIGURE 4 is a sectional view taken along line 4—4 in FIGURE 3;

FIGURE 5 is a sectional view taken alog line 5—5 in FIGURE 3; and

FIGURE 6 is a sectional view taken along line 6—6 in FIGURE 3.

Figure 1:
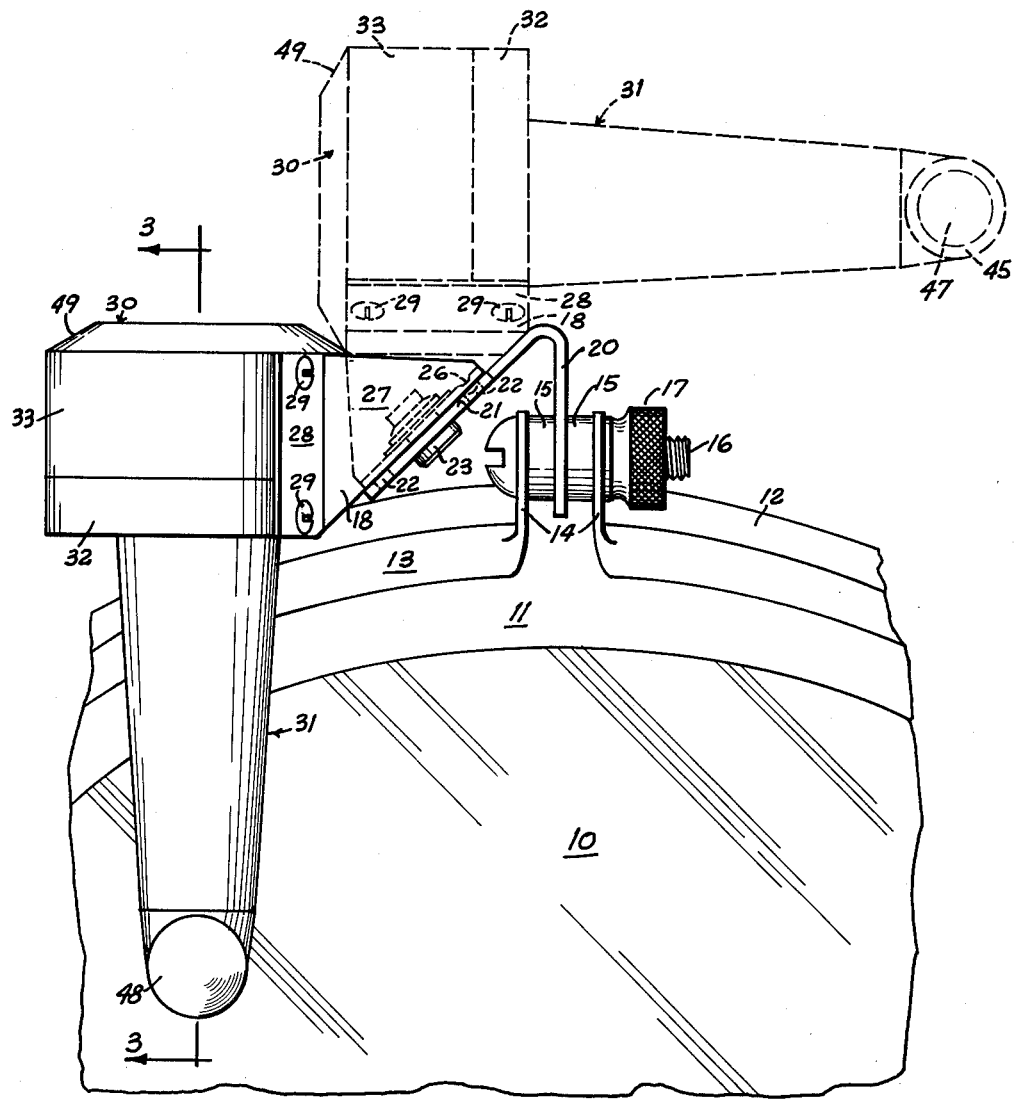
FIGURE 1 is a fragmentary view of the top portion of a conventional skin diving face mask provided with the instant compass attached thereto, the storage position of the compass being illustrated in dashed lines.

The compass described below is designed for use by skin divers, who commonly utilize a face mask having a large lens 10 made of safety glass through which the user of the mask can view the surrounding environment within which he is working. The lens 10 is mounted by means of a flexible rubber frame 11 that extends entirely about its periphery, and which includes a rearwardly directed flange 12 adapted to seal against the diver's face. The frame 11 is secured to the lens 10 by means of a peripheral metal ring 13. The ring 13 is clamped in place by upwardly turned legs 14 and a bolt 16 and nut 17. In the normal structure, a single spacer would be provided between the two legs 14.

The only modification required from conventional mask assembly is the provision of a pair of spacers 15 between legs 14 so that spacers 15 can grip between them an angular bracket having an upright leg 20. The angular bracket carried by the upright leg 20, which is suitably apertured to receive the locking bolt 16, also includes a mounting face 21 that is directed at an angle of 45° relative to the upright leg 20. The mounting face 21 carries on it a pivotable bracket 18 having sides 27 terminating in outwardly bent flanges 28 which are adapted to be secured to the body of the compass by means of screws 29.

The bracket 18 is mounted on the face 21 of the angular bracket by means of a pivot shaft 23 and a locking pivot spring 24 that grips a groove at the upper end of the shaft 23. The spring 24 bears against a washer 25 in order to facilitate turning of the bracket 18 relative to the face 21.

Formed through the mounting face 21 are two circular apertures 22 which can be seen in dashed lines in FIGURE 1. The apertures 22 are diametrically opposed to to one another through the axis of the pivot shaft 23, being spaced 180° apart and at the same radial distance from the axis of shaft 23. The bracket 18 is provided with a downwardly bent detent or bump 26 at the same radial distance from the axis of shaft 23, so that the detent 26 can be selectively received within either of the apertures 22. The location of the detent 26 and apertures 22 is such that the compass will be selectively positioned in either its operational position which is illustrated in full lines in FIGURE 1, or in its storage position illustrated in dashed lines in FIGURE 1. Due to the 45° angle subtended between the mounting face 21 and the upright leg 20 of the angular bracket, the rotation of the bracket 18 by 180° about the axis of shaft 23 will result in the compass being rotated 90° about a horizontal axis (see FIGURE 1).

The compass itself can best be seen in FIGURES 2 through 6. It basically comprises an upper compass housing 30, a depending forward casing 31, and a prism 45. These portions are all sealed relative to one another and have some common structural features. Basically, there is provided a body 32 made of acrylic plastic and a cover 33 of the same material. The two are secured to one another and sealed about their abutting surfaces to thereby form compass housing 30 and to enclose a cylindrical hollow chamber 34 having a vertical central axis when the compass is in its operational position shown in FIGURE 1. Mounted coaxially within the hollow chamber 34 is a shaft holder 35, preferably made of brass, which has a centrally-mounted upstanding shaft 36 secured thereto. Shaft 36 is preferably made of hardened steel and is formed with a pointed upper end that can best be seen in FIGURE 6.

Carried on the upper end of the shaft 36 is a compass disk 37 of acrylic plastic having fixed at its center a coaxial jewel holder 38 that is tubular in shape which in turn mounts a jewel bearing 40 having a hollow conical lower surface. The purpose of the jewel bearing 40 is to enable the disk 37 to be located upon the pointed end of the shaft 36 and to facilitate turning of the disk 37 with a minimum of frictional loss. When the compass is turned above the user's head, the bearing 40 will disengage from shaft 36.

The disk 37 has fixed to it a pair of bar magnets 39 which are bent from a common piece of metal stock, and which extend diametrically along the disk and at each side of the center thereof. The bar magnets 39 provide the necessary magnet in order to enable the disk 37 to function as a compass.

The lower surface 41 of the disk 37 is coated with an opaque material, which can be provided by means of a common silvering process. However, as the bottom surface of the disk 37 is being coated, the desired compass card pattern 42 as seen in FIGURE 4 is not coated so that a silhouette effect is achieved. The disk 37 is also grooved as seen at 43 along its top surface in alignment with the unsilvered lines previously described, using a grooved configuration with angularly sloped sides and a flat bottom.

The body 32 is provided with a longitudinal hollow aperture 44 that depends downwardly from the front of the hollow chamber 34. The aperture 44 is in alignment with an aperture 29 formed at the front portion of the shaft holder 35, so that the interior of the aperture 44 is in open communication with the interior of the hollow chamber 34 at the front end thereof. Thus, light received within the hollow chamber 34 can pass through the aperture 29 in the opaque shaft holder 35 and thereby enter the long aperture 44 in the body 32.

At the bottom of the body 32 is secured the prism 45 having an upwardly directed lens surface 46 and a front prism surface 50. The prism surface 50 is at an angle of 45° relative to the central axis of the chamber 34 so that the prism 45 is directed upwardly parallel to the central axis of hollow chamber 34 and rearwardly perpendicular thereto. The prism 45 is formed with an integral convex lens surface 46 directed upwardly through the long aperture 44 and a plane viewing surface 47 which is recessed to protect it from being accidentally damaged. The prism surface 50 is protected and covered by a front cover 48 that is sealed to the prism 45 and encases an air space, thereby providing the desired reflective character to the prism surface 50. Although less efficient, the same basic result could be obtained by silvering the surface 50 if so desired.

One problem involved in viewing any device under water is the scarcity of light, which becomes more acute as greater depths are reached by the user of the device. The present compass makes use of transmitted light to provide a reading of the compass before the eye of the user. In addition, every effort is made to increase and magnify the amount of light that is finally directed to the viewer's eye. This is achieved first by use of acrylic plastic as the substance for the housing 30, the casing 31 and the prism 45. This makes maximum use of the property of such plastics in transmitting light edgewise. For this reason, the upper periphery of the cover 33 is chamfered as seen at 49, to thereby direct additional light to the interior of the hollow chamber 34.

We have also discovered that additional magnification of the image in terms of light intensity can be achieved by making the disk 37 of an acrylic plastic having a fluorescent pigment therein. One such material is a red fluorescent Plexiglas, No. 2085, made by Rohm and Haas Company. This allows the disk 37 to fluoresce in response to ultraviolet light. The entire top surface of the disk 37 gathers ultraviolet light which is converted to visible light by the fluorescent nature of the pigment within the plastic. This light is reflected at the grooved pattern due to the edgewise transmissibility which is a property of the plastic material. These features combined present a more intense lighted effect to brighten the compass card pattern 42.

The prism 45 acts as a simple magnifier of the image transmitted through the disk 37 by incident light, both visible and invisible, and projects this image as a colored image apparently forward of the user, dependent upon the nature of the lens surface 46. We prefer to utilize a lens curvature that will project the image apparently about 15 feet before the person wearing the mask. The image will be available at all times, and will not interfere with the normal vision of the user, since it will appear in only the field of one eye.

The magnet 39 is designed to be positioned on edge for minimum interference with the visible compass pattern 42 so as to not prohibit the transmission of light through the disk 37. It must also be shaped for proper weight distribution with respect to the pivot shaft 36 and is secured to the disk 37 by means of a press fit between the disk 37 and the bent bottom flange of the jewel holder 38 (see FIGURE 6).

The pivot shaft holder 35 serves two additional purposes besides the positioning of the shaft 36. Being made of brass, it provides eddy current damping of the motion of the rotatable disk 37. It also maintains a darkened area under the disk 37 so as to better accentuate the small lighted pattern that is allowed to pass through the aperture 29.

In order to further utilize all available light, it is preferred that the peripheral edges of the disk 37 be silvered so as to eliminate light loss along the edges.

All of the metal materials used in the mounting bracket for the compass must be of non-magnetic material, such as stainless steel. This includes the angular bracket comprising upright leg 20 and the mounting face 21 as well as the bracket 18, the spacers 15, bolt 16 and nut 17. Provision can be made for horizontal adjustment to accommodate the eye position of a particular user by changing the dimensions of the two spacers 15 and by vertical adjustment available by means of a slotted hole in the upright leg 20 through which the bolt 16 can be selectively positioned.

It is to be understood that the prism 45 might also be made of any clear plastic material, or glass. Likewise, the cover 48 could be manufactured of any corrosion-resistant material that could be bonded or fused to the prism 45 to provide the necessary sealed air space. Other fluorescent materials can be utilized in the disk 37 to make use of available ultraviolet light, and to change the color of the image for various conditions as might be required. It is normally advisable to utilize a pigment that will fluoresce in a color that will contrast with the surroundings that will be encountered by the diver while under water. The body 32 of the compass can be made of any plastic material, glass or corrosion-resistant metal. Cover 33 can be produced of any clear plastic or glass material capable of transmitting the required light, with a bonded, fused, or mechanical joint between the body 32 and the cover 33. Naturally, this joint must be completely waterproof and capable of withstanding external pressure.

Various modifications can be made in the disclosed structure without deviating from the basic concept contained therein. For this reason we do not wish the details of the preferred embodiment of this invention to restrict the scope of the invention itself which is set out in the claims which follow.

Having thus described our invention, we claim:
1. A compass for underwater use comprising:
   a bracket adapted to be attached to the peripheral ring of a face mask;
   a compass housing attached to said bracket, said compass housing being located above the mask in vertical alignment with one eye of a person wearing the mask, said compass housing having formed therein a cylindrical hollow chamber having an upright cen- tral axis, the upper portion of said housing being made of light-transmitting solid material;

an opaque disk mounted within said housing for rotation about said central axis, said disk having formed thereon a plurality of light-transmitting indications spaced angularly about said central axis;

a bar magnet fixed to said disk in a radially extended location;

a depending hollow casing open in sealed relationship to said compass housing at the front thereof, having a longitudinal axis parallel to said central axis;

and prism means at the lower end of said casing located at the eye level of a person wearing the mask and directed axially upward through the casing parallel to said central axis and also rearwardly at an angle perpendicular to said central axis.

2. A compass as defined in claim 1 wherein said disk has one surface thereof coated with an opaque material with the sole exception of said angularly spaced indications.

3. A compass as defined in claim 1 wherein the inside lower surface of the chamber within said compass housing is opaque and is provided with a front aperture therethrough in axial alignment with the longitudinal axis of said casing.

4. A compass as defined in claim 1 wherein said prism means includes an integral convex lens directed axially upward through the casing parallel to said central axis.

5. A compass as defined in claim 1 wherein said disk comprises:

a coaxial central tubular jewel holder fixed thereto and extending through the disk center, said jewel holder having a jewel bearing therein including a downwardly directed conical surface, said jewel holder being axially open through its lower end;

and an upright shaft fixed to said compass housing extending upwardly within said hollow chamber coaxially with said central axis, said shaft having its upper portion received within the lower portion of said jewel holder, the upper end of said shaft being complementary to the conical surface of said jewel, which is thus centered thereon.

6. A compass as defined in claim 1 wherein said disk is formed of a rigid light-transmitting material containing a fluorescent pigment, one surface of said disk being coated with an opaque material with the sole exception of said angularly spaced indications.

No references cited.

ISAAC LISANN, *Primary Examiner.*